US008972947B2

(12) United States Patent
Orr et al.

(10) Patent No.: US 8,972,947 B2
(45) Date of Patent: Mar. 3, 2015

(54) DATA PRESENTATION IN INTEGRATED DEVELOPMENT ENVIRONMENTS (71) Applicant: Apple Inc., Cupertino, CA (US)

(72) Inventors: Kenneth S. Orr, Cupertino, CA (US); Giulia M. Pagallo, Cupertino, CA (US); Geppy Parziale, San Francisco, CA (US)

(*) Notice: Subject to any disclaimer, the term of this patent is extended or adjusted under 35 U.S.C. 154(b) by 52 days.

(21) Appl. No.: 13/844,124

(22) Filed: Mar. 15, 2013

(65) Prior Publication Data
US 2014/0196013 A1 Jul. 10, 2014

Related U.S. Application Data (60) Provisional application No. 61/750,783, filed on Jan. 9, 2013.

(51) Int. Cl.
G06F 9/44 (2006.01)
G06F 11/36 (2006.01)

(52) U.S. Cl.
CPC .................................. G06F 11/3624 (2013.01)
USPC ........... 717/125; 717/106; 717/110; 717/136; 707/756; 709/201

(58) Field of Classification Search
None
See application file for complete search history.

(56) References Cited

U.S. PATENT DOCUMENTS

| | | | |
|---|---|---|---|
| 5,787,245 A | 7/1998 | You et al. | |
| 5,815,653 A | 9/1998 | You et al. | |
| 6,412,106 B1 | 6/2002 | Leask et al. | |
| 7,251,808 B2 | 7/2007 | Bates et al. | |
| 7,434,205 B1* | 10/2008 | Steenhagen et al. | 717/124 |
| 7,657,873 B2 | 2/2010 | Horton et al. | |
| 2001/0021985 A1 | 9/2001 | Aldridge et al. | |
| 2002/0004845 A1* | 1/2002 | Yamamoto et al. | 709/240 |
| 2003/0221185 A1* | 11/2003 | Bates et al. | 717/125 |
| 2004/0031019 A1 | 2/2004 | Lamanna et al. | |
| 2004/0221270 A1* | 11/2004 | Witchel et al. | 717/124 |
| 2005/0246690 A1* | 11/2005 | Horton et al. | 717/125 |
| 2006/0236365 A1* | 10/2006 | Pham | 726/1 |
| 2008/0005670 A1* | 1/2008 | Pravetz et al. | 715/530 |
| 2008/0126379 A1* | 5/2008 | Jain et al. | 707/101 |
| 2011/0067010 A1* | 3/2011 | Dullien et al. | 717/132 |
| 2011/0320876 A1* | 12/2011 | Klein et al. | 714/38.1 |
| 2012/0066549 A1* | 3/2012 | Gould et al. | 714/37 |
| 2012/0151437 A1* | 6/2012 | Kneisel et al. | 717/114 |
| 2012/0272216 A1 | 10/2012 | Bates | |
| 2013/0237145 A1* | 9/2013 | Tischer et al. | 455/7 |
| 2014/0101359 A1* | 4/2014 | Bybell et al. | 711/6 |
| 2014/0101361 A1* | 4/2014 | Gschwind | 711/6 |
| 2014/0114929 A1* | 4/2014 | Henrichs et al. | 707/687 |
| 2014/0163747 A1* | 6/2014 | Imhof | 700/276 |
| 2014/0196005 A1* | 7/2014 | Proctor et al. | 717/106 |

* cited by examiner

Primary Examiner — Chameli Das
(74) Attorney, Agent, or Firm — Womble Carlyle Sandridge & Rice, LLP (57) ABSTRACT Methods and apparatus are provided to access and present data from a process executing on a separate device, with the data being presented in a form suitable for the type of data, such as a graphical structure that represents the data. The methods include receiving a request to display a first data object stored in a memory of a second computing device, wherein the first object is of a first data type in a process configured to execute on the second computing device, generating an expression configured to convert the first data object to a defined data format, sending the expression to the process, executing the expression in the process to produce intermediate data that represents the first object in the defined format, receiving the intermediate data, creating a second object of a second data type based upon the intermediate data, and displaying a graphical structure of the second object.

24 Claims, 6 Drawing Sheets

DATA PRESENTATION IN INTEGRATED DEVELOPMENT ENVIRONMENTS

CROSS REFERENCE TO RELATED APPLICATIONS

This application claims priority to U.S. Provisional Patent Application No. 61/750,783, filed Jan. 9, 2013, and entitled DATA PRESENTATION IN INTEGRATED DEVELOPMENT ENVIRONMENTS, which is incorporated herein by reference in its entirety and for all purposes.

TECHNICAL FIELD

The present invention relates generally to communication and presentation of data in computer systems. More particularly, the present embodiments relate to communication, transformation, and presentation of variable data in integrated development environments.

BACKGROUND

Integrated Development Environments, such as the Xcode® development environment provided by Apple®, Inc. of Cupertino, Calif., can be computer software programs that are used to control execution of other programs, and view and change the other programs' memory contents and state. Controlling programs and accessing their memory is useful, for example, for finding errors in the programs, an activity which is referred to as debugging the program. A debugger component provided by an Integrated Development Environment (IDE) can be used to specify breakpoints, which are points, e.g., located at source code lines, in a program at which execution is to stop. When execution stops at a breakpoint, the program's memory state can be inspected or changed. The debugger can subsequently cause the program to continue executing until another breakpoint is reached. Alternatively, the program can be executed one statement at a time, so that the program state can be monitored as each statement is executed.

SUMMARY

The present application describes various embodiments regarding presentation of data values in graphical user interfaces of software development tools such as integrated development environments (IDE's). In one or more embodiments, an Integrated Development Environment (IDE) can be used to develop and debug computer programs. The computer programs can manipulate data of complex types, such as graphical images, files, web pages, application documents, videos, and so on. Existing IDE's display these variables as numeric values, e.g., memory addresses, which have little meaning to a user. Software development tasks, such as debugging, can be simplified by displaying graphical representations of variables in the IDE, since such graphical displays enable a user to quickly view the contents of complex variables.

The IDE and the computer program being debugged can execute on different computing devices that can be of different types. For example, the IDE can execute on a desktop host computer, and the program being debugged can execute on a mobile device that runs an operating system different from that of the desktop host. Techniques disclosed herein enable the host computer to display graphical representations of complex data types that exist on the mobile device, even though the data types used to generate the graphical representations on the host are different from the data types that represent the data on the mobile device. The IDE can request data representing an object in a particular format according to instructions associated with the object's data type. The IDE can then receive the representation of the object from the mobile device. The IDE can reconstruct the object using a data type available on the IDE's host system, and display a graphical representation of the reconstructed object. The reconstruction can be performed using a type-specific plugin that provides the instructions associated with the object's data type.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The present application describes various embodiments regarding presentation of data values in graphical user interfaces of software development tools such as integrated development environments (IDE's). In one or more embodiments, an Integrated Development Environment (IDE) can be used to develop and debug computer programs. The computer programs can manipulate data of complex types, such as graphical images, files, web pages, application documents, videos, and so on. Existing IDE's display these variables as numeric values, e.g., memory addresses, which have little meaning to a user. Software development tasks, such as debugging, can be simplified by displaying graphical representations of variables in the IDE, since such graphical displays enable a user to quickly view the contents of complex variables.

The IDE and the computer program being debugged can execute on different computing devices that can be of different types. For example, the IDE can execute on a desktop host computer, and the program being debugged can execute on a mobile device that runs an operating system different from that of the desktop host. Techniques disclosed herein enable the host computer to display graphical representations of complex data types that exist on the mobile device, even though the data types used to generate the graphical representations on the host are different from the data types that represent the data on the mobile device. The IDE can request data representing an object in a particular format according to instructions associated with the object's data type. The IDE can then receive the representation of the object from the mobile device. The IDE can reconstruct the object using a data type available on the IDE's host system, and display a graphical representation of the reconstructed object. The reconstruction can be performed using a type-specific plugin that provides the instructions associated with the object's data type.

For example, the host system may represent an image variable using an NSImage data type, and the second computing device may represent the image variable using a UIImage data type. The data types represent thus the same object, but the format of data and other details about the data type can be different on the two systems.

To display a value of a variable, the host system generates a request, which can include instructions for generating the value, and sends the request to the second computing device. The second computing device receives the request, executes the instructions to generate a block of data from the representation of the variable that uses the second computing device's data type, and sends the block of data back to the host system. The host system decodes and transforms the block of data into a format suitable for the host data type. A variable of the host data type is formed using the transformed data and displayed in the user interface as the value of the requested variable. Data can be sent between the two systems via a computer network using a protocol such as TCP/IP, WiFi, Bluetooth, Universal Serial Bus (USB), or the like.

Figure 1A:
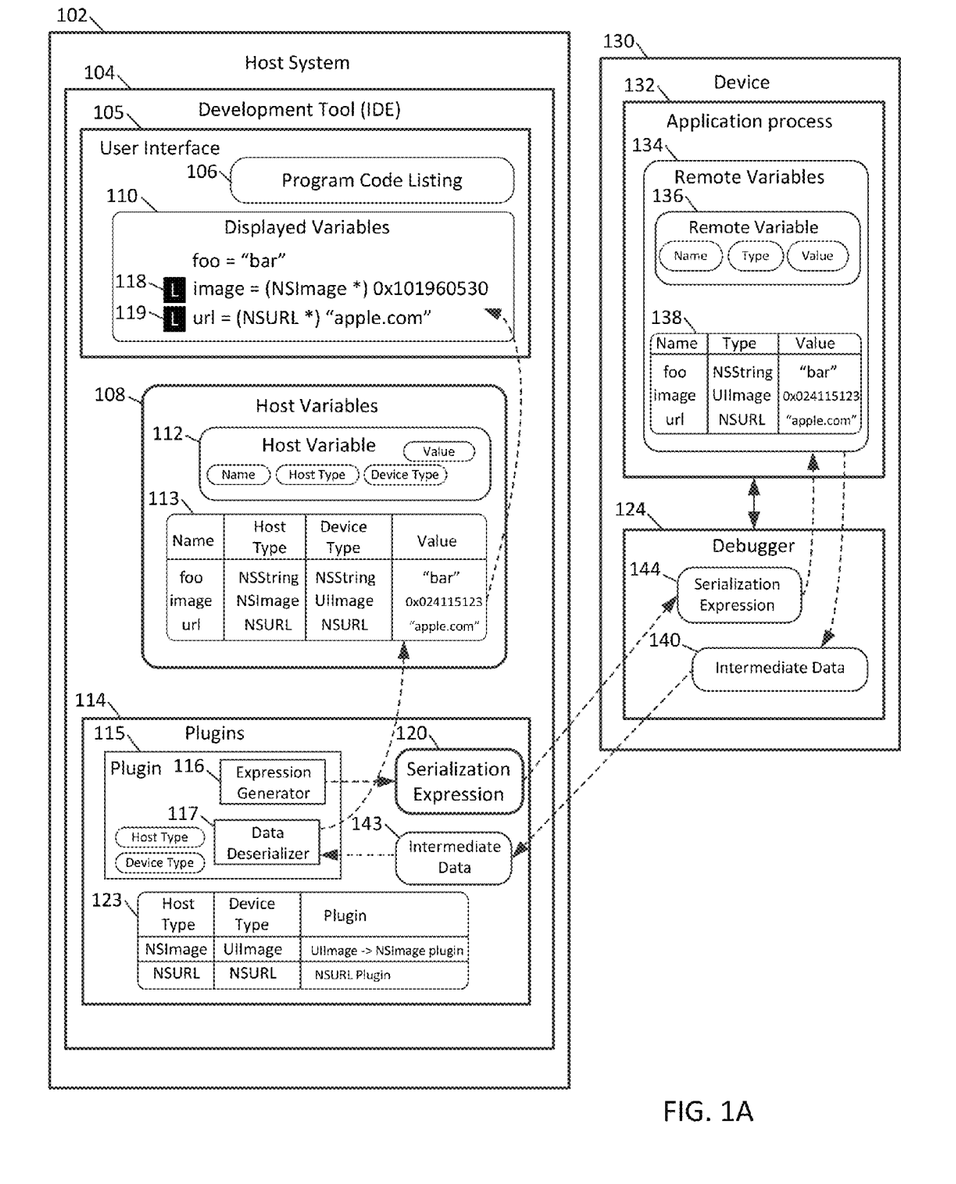
FIGS. 1A and 1B are diagrams showing a multi-platform integrated development environment (IDE) in accordance with one or more embodiments.

FIG. 1A is a diagram showing a multi-platform software development tool 104 in accordance with one or more embodiments. The software development tool 104 may be, for example, the Xcode® Integrated Development Environment (IDE) or the like, which provides features that software developers can use to create, run, and debug computer program code. The development tool 104 is referred to herein as an IDE 104, but can be any system that provides the facilities described herein for debugging computer programs. In one or more embodiments, the IDE 104 executes in an IDE process on a host computing device 102, such as a desktop computer running an operating system, e.g., Mac OS X™ or the like. The IDE 104 controls an application process 132 that executes on a second computing device 130. The second computing device 130 can be, for example, a mobile device running an operating system such as iOS®, or a laptop computer running the same operating system as the host computing device, or another desktop computer running a different operating system, and so on. The application process 132 ordinarily executes in a different memory address space than the IDE process, though, in some implementations, the application process 132 and the IDE process can be combined in a single process in the same memory address space.

The IDE 104 presents a user interface 105 on a display of the host system 102. The user interface 105 can display a program code listing 106, such as the source code of a program being debugged. The source code may be computer program code instructions in a language such as C, Objective C, C++, Java, or the like. The IDE 104 provides control over the execution of the program being debugged, such as the application process 132, which is an executing instance of the program code shown in the program code listing 106. For example, a user of the IDE 104 can set break points at particular lines or locations in the program code 106 of the application process 132. Execution of the application process 132 pauses when the program code line at the breakpoint is about to be executed on the device 130, at which point the user can examine or change the values of program variables, continue execution in a step-by-step mode, cause execution to resume until the next breakpoint, and so on. Although the description herein focuses on use of the IDE 104 to debug programs that execute on a different device or computer system 130 than the IDE 104, the IDE 104 can also be used to debug programs that execute on the local host system 102. The program code listing 106 can display statements of the program as the statements are executed on the device 130.

The user interface 105 displays variables 110 from the executing program. In one aspect, the displayed variables 110 can be, for example, a list of variables and corresponding values in the current stack frame, I.e., execution context, of the application process 132. In another aspect, the displayed variables 110 can be a list of variables and corresponding values that have been selected by the user for display. For example, a string-type variable named "foo" that has a value "bar" can be displayed as "foo=bar". The value of the foo variable is read from the device 130, which executes the application process 132 in which the variable foo 136 is stored. That is, the value of the foo variable displayed in the IDE 104 is set to the value of a corresponding foo variable executing in the process 132 on the device 130.

In one or more embodiments, the IDE user interface 105 displays variable values (as shown in displayed variables 110) by retrieving the values of the variables from the device 130 and transforming the values from the data representation format used on the device 130 to the format used on the host 102. To assist in the transformation process, the IDE 104 constructs a set of host variables 108 and their associated types and values in a memory of the host system 102. In one aspect, the host variables 108 and displayed variables 110 can be represented as values in a data structure such as a variables table 113. The variables table 113 can be constructed using type information that is available to the IDE 104 and to the debugger 124. Each value in the variables table 113 is of a particular type and has a type-specific format in memory. The variables table 113 includes a name column, which stores the name of the variable, a host type column, which corresponds to the data type used to represent the variable on the host system 102, a device type column, which corresponds to the data type used to represent the variable on the device 130, and a value column, which stores the value of the variable. The variables table 113 can be created by a set of one or more plugins 114 based on information received from the debugger 124 that executes on the device 130.

The host type is a type that is native to the host system 102, and is used to store the host data value on the host system 102. The host variable 112 is an instance of the host type. In one aspect, the value of each host variable 112 on the host 102 is the same as the value of the corresponding remote variable 136 on the device 130. The actual data that represents the host variable 112 can be different from the data that represents the remote variable 136 because two different computers, such as the host and the device, can use different data formats to represent the same value. Therefore, if the host system 102 and the device 130 use different data representations, the data that represents the value of the remote variable 136 on the device 130 can be translated to different data that represents the same value on the host system 102. That is, the data type of the remote variable 136 is native to the device 130, and may be, but is not necessarily, native to the host system 102. If the host and device types are different or use different data representations, a conversion can be performed between variables 134 that reside on the device 130 and variables 108 that reside on the host system 102.

To assist in selection of the appropriate plugin 115 to be used for transforming values between a given pair of types, the IDE 104 constructs a plugins table 123 that maps host types and device types to the plugins that transform values between those types. The plugins table 123 includes or references a type-specific plugin 115 for each data type of remote variable 136. The type-specific plugin 115 for a particular data type can generate type translation instructions for serializing remote variables 134 on the device 130 to form platform-independent values (i.e., intermediate data 140). These instructions can be, for example, an expression 120 that a debugger executes to generate the platform-independent values that represent the remote variables 134. The platform-independent values can be sent from the device 130 to the host system 102 via a communications network. The serialization expression 120 can be generated by an expression generator 116. The expression generator 116 can be implemented specifically for each type of variable to generate the particular expression that causes the debugger 124 to print or otherwise output the value of that variable.

The type-specific plugin 115 can also generate type translation instructions for de-serializing the platform-independent values to form the values of host variables 108 of particular remote types. The de-serialization instructions can be generated and executed by a data de-serializer 117. A plugin 115 can be selected for a particular device type specified in the variables table 113. To select the plugin 115, the plugins table 123 can be searched for an entry having a device type that matches the particular device type. If a matching entry is found, then the matching entry's plugin column value specifies the plugin to be used for transforming the remote variable 136. In another embodiment, the host type column can be used as the search column instead of or in addition to the device type column. The de-serializer can be implemented specifically for each type of variable as a companion to the expression generator. The de-serializer includes instructions that can de-serialize, e.g., unpack or unmarshal, the machine-independent intermediate data 143 generated by the serialization expression 120. The expression generator 116 and data de-serializer 117 can generate intermediate data 140 in any suitable format, as long as both the generator 116 and the de-serializer 117 use the same format. The format can be, but is not necessarily, machine-independent. The format can be for example, external data representation (XDR), XML, Unicode, or other encoding format.

In one or more embodiments, the IDE 104 displays the values of the host variables 108 in the displayed variables 110 portion of the user interface 105. The name of the variable, e.g., "foo," is displayed near the value of the variable, e.g., "bar." For some types, e.g., numeric and string types, displaying the value of the variable in this text form is sufficient to allow the user to inspect the value. However, for other types, including complex types that are instances of classes or structures, or pointers to types, the text values shown in the displayed variables 110 are numbers, such as memory addresses, that have little meaning to human users. For example, an image variable 112 that has a graphical image value is displayed as an actual image. An image variable can alternatively be displayed as "image=0x101960530", where the number is a numeric memory address. Displaying an image as a number provides little insight or meaning to the developer using the IDE 104.

In one or more embodiments, using the techniques described herein, a graphical image referenced by the image variable can be displayed in the IDE user interface 105 as the value of the image variable 112. As a user steps through the program code listing 106 to execute and debug the program located in the application process 132, the data values of variables 134 in the memory of the process 132 are brought from the second computing device 130 to the host system 102 and, prior to or subsequent to being sent to the host 102, transformed to a format, such as a graphical image, that represents the value in a meaningful way, e.g., by depicting structure of the data in the form of the image represented by the data, and can be displayed in the user interface of the IDE 104 on the host system 102. In this example, the actual image value of a variable named image 138 of type UIImage in the application process 132 is sent to and rendered on the host system 102. The UIImage type exists on the device 130 but not on the host system 102. The host system 102 does have an analogous "NSImage" type that represents a graphical image. The data from the UIImage variable named "image" in the application process 132 is thus converted to the format used by the NSImage type on the host system 102, and a variable named "image" of the NSImage type is created on the host system 102 from the converted data.

The IDE user interface 105 can provide features for "remotely" debugging programs such as the program executed by the application process 132 on the device 130. A user of the IDE 104 can issue a command to display a variable by, for example, selecting the name of the variable, such as the text "image" displayed for the variable 112 in the IDE user interface 105. The name of the variable can be selected from a list of variables that are active at the current point (i.e., instruction) in the application being debugged. Such a list is displayed by the IDE user interface 105, and a name can be selected by a user-issued command, such as moving a cursor onto the variable name, or otherwise selecting the variable name. The variable has a particular value, which is, for example, data in a computer memory. The data is represented in the computer system as a sequence of binary digits that, when displayed in their numeric form, are not particularly meaningful to human user. Existing programming tools, such as existing debuggers, present the data to users in this numeric form, However, since the data represents complex objects such as images, documents, audio, and the like, the numeric form is difficult for users to interpret or understand.

In one or more embodiments, to improve the efficiency and usability of programming tools such as debuggers, the data variables 134 used by an executing program (i.e., application process 132) being debugged or executed in a programming tool 104 can be presented, e.g., displayed, in a visual representation (e.g., in displayed variables 110) on a screen, played on an audio speaker, or otherwise output, in a meaningful human readable form. The visual representation can be displayed in a popover window or the like.

In one or more embodiments, a "Quick Look" user interface feature 118 is displayed near the name of a variable that has a value not completely represented by the text shown near the name of the variable. A user can place a cursor over or select the Quick Look feature 118 to cause a human readable representation of the variable to be displayed. The human readable representation is, for example, a graphical or audio rendering of the value of the corresponding host variable. For example, the Quick Look feature 118 is displayed near a variable named "image." The type of the image variable is "pointer to NSImage" and the value of the pointer is 0x101960530. There is an NSImage object at that address in memory, but the content of the object is not shown. The value that is shown as text, i.e., 0x101960530, is of little meaning to a user, and is not a human-readable representation of the image object's value. Therefore, to display the image object's value, the user can move or hover a cursor over or select the Quick Look feature 118. In response, a window or panel appears, and a graphical rendering of the image is displayed in the panel.

Figure 3:
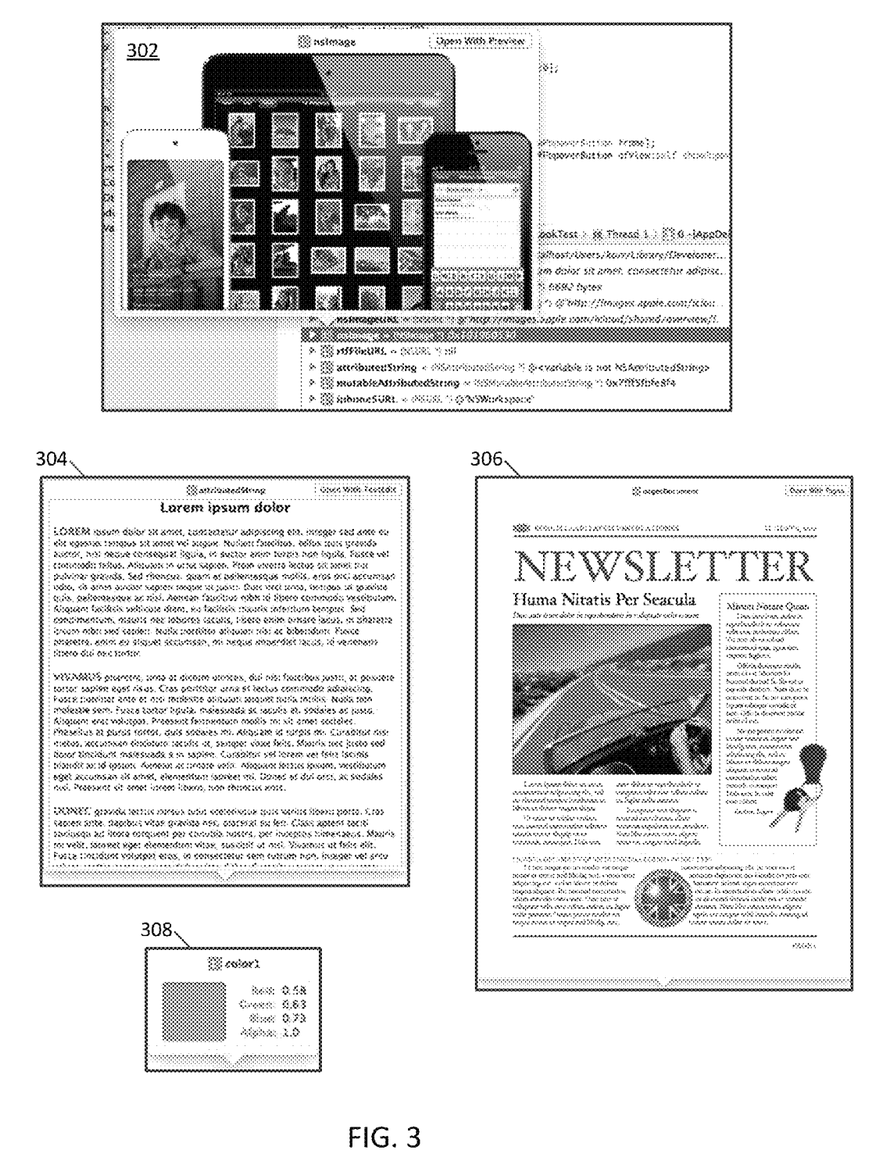
FIGS. 3 and 4 illustrate graphical representations of the structure of data in accordance with one or more embodiments.
Figure 4:
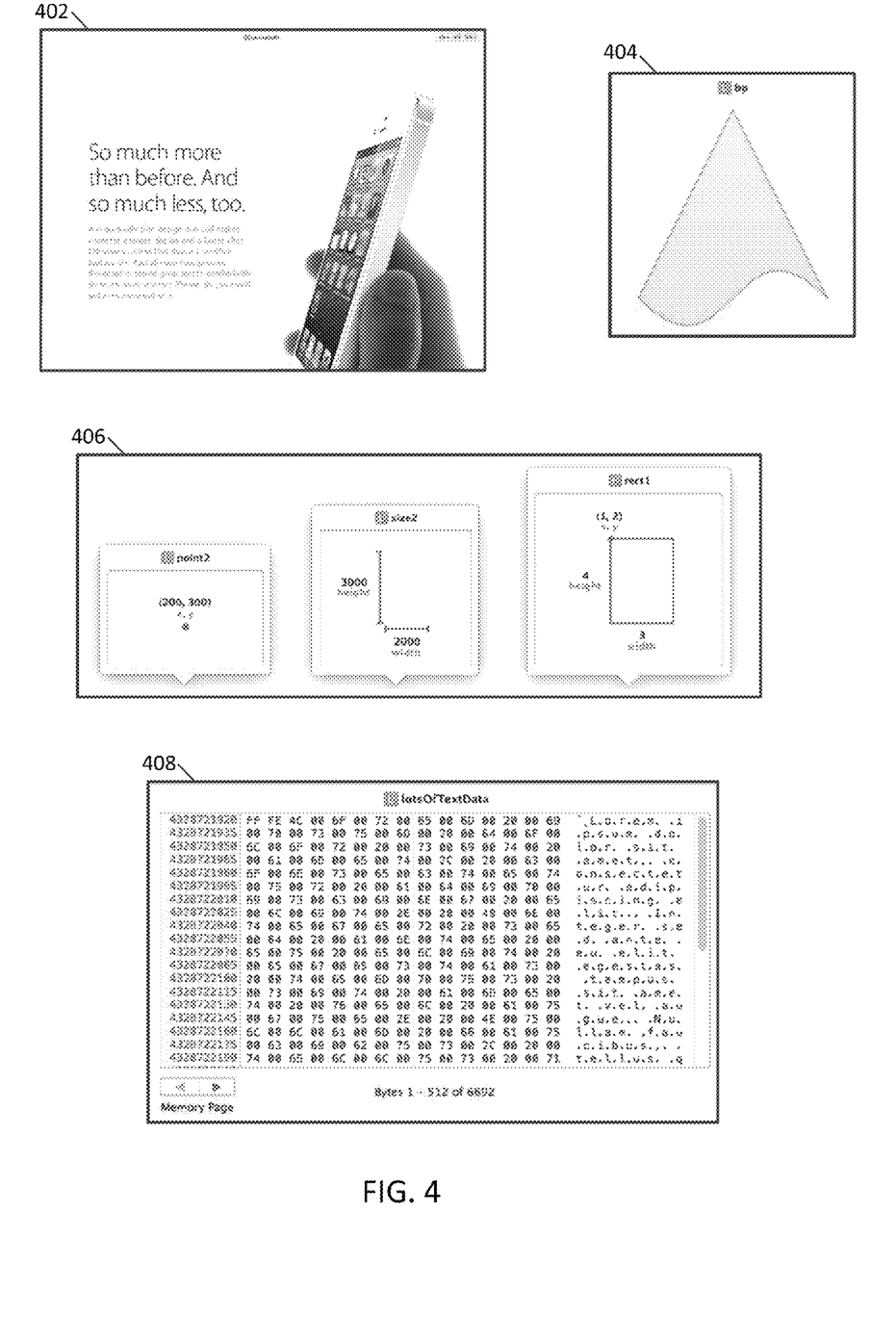

An example can be seen in FIG. 3, where an nsImage Quick Look panel is displayed in an IDE user interface. The displayed image is an example of a meaningful representation of the nsImage variable. A second Quick Look feature 119 is shown near a variable named "url." The url variable's type is "pointer to NSURL" and the value of the variable is a string that is shown as "apple.com". Although the value of the variable is displayed, the Quick Look feature is still present, because the url variable refers to a document, such as a web page, and the document can be displayed. If the user selects the Quick Look feature 119, a window or panel appears, displaying the web page or document identified by the url variable. FIG. 4 illustrates an example window 402 showing a displayed representation of a document that can be displayed when a user selects the Quick Look feature 119. Thus, a value of the url variable is displayed, and additional data can be displayed in a popover window or other user interface component.

In one aspect, a meaningful format can be a format that is human readable, in the sense that a human can directly understand the content of data presented in that format, without performing any additional mappings, conversions, or formatting. Meaningful representations of data can include the rendering, in graphics or sound, of the data. In another aspect, a meaningful format can be a format that provides additional information, such as the web page content described above, which is related to an existing data item, such as the URL (Uniform Resource Locator) for the web page content. The meaningful representations can be provided by the operating system or application associated with that data. Examples of meaningful representations of data are shown in FIGS. 3 and 4. For example, FIG. 3 shows a list of variables, which includes an nsImage variable that has been selected by a user of the debugger. Different variables can refer to different types of data, and the data associated with the variable is displayed in a meaningful format that is appropriate for the type.

When the user issues a command to display a variable, the IDE 104 requests the value of the variable by sending one or more commands to the debugger 124. The debugger 124 issues the commands to the application process 132 to request the value of the variable. In one example, the debugger 124 controls the application process 132 via the process's runtime. The IDE 104 can communicate with the debugger 124, and the debugger 124 can communicate with the application process 132 by, for example, sending request messages to the device 130 via a communication network, or by other interprocess or intra-process communication mechanisms (not shown). For example, the developer (i.e., user of the IDE) may request an NSImage variable named "image" when the debugger 124 hits a breakpoint in the program code listing 106. The application process 132 pauses, i.e., temporarily suspends execution, at the breakpoint, and the debugger 124 sends a message requesting the value of the image variable to the application process 132. In one example, the image variable is of type UIImage, which is a data type that is present in the application process 132, but not in the IDE process. Furthermore, the UIImage type need not be defined on the host system 102. A representation of the UIImage variable named image in the application process 132 can be sent to the host system 102 and transformed to another data type, e.g., NSImage in the example of Mac OS X®, or other appropriate data type, for display in a variable list (e.g., in displayed variables 110) as the value of the image variable 112.

In one or more embodiments, the IDE 104 and the application process 132 are located on different hosts, and the debugger 124, e.g., LLDB (Low Level Debugger) or the like, provides the communication channel between the IDE 104 and application process 132. The debugger can be located on the device 130 and can interact with the runtime system of the application process 132. The IDE 104 can also include a debugger component (not shown) located on the host system 102, and the IDE debugger component can communicate and cooperate with the debugger 124. The debugger 124 can translate data between different formats that may be used by the two systems 102, 130, e.g., different sizes of an integer data type used by the two systems. The debugger 124 can use data marshaling, for example, to convert the data between the formats used by the two systems. The debugger 124 controls the execution of the application process 132, and can access the application process 132's memory.

The debugger 124 can receive the expression 120, execute the expression 120 on the second device 130, and provide the result of executing the expression to the IDE 104 on the host system 102. The plugins 114 know the format of the received data and convert the data to a form that is meaningful for presentation as an image in the debugger. The IDE then displays the image as the value of the image variable 112, e.g., adjacent to the name of the image variable in displayed variables 110, or in a popover or popup window that appears near the name of the image variable. For example, FIG. 3 shows a popover window that displays an image representing the value of a variable named nsImage. The nsImage variable's type is "pointer to the NSImage type." The nsImage variable's value is interpreted as an image by instructions associated with the NSImage type, and the image is presented in the popover window 302 in the user interface. The popover includes a button labeled "Open With Preview" that can be used to load the image into an application that displays images.

In one or more embodiments, to generate a representation of the variable that can be sent to the IDE 104, the expression 120 can be run, e.g., evaluated, in the application process 132 by the debugger 124. The expression 120 can be generated by a plugin 115 that corresponds to the data type of the variable being requested. Plugins 114 can be defined for each data type to be displayed on the IDE 104. In one implementation, the plugin can be determined by table lookup. For example, a type conversion table (i.e., plugins table 123) can be established to map data types of application variables 134 to data types of IDE variables and to the plugins to be used to convert from the application variable types to the host system types.

The plugins 114 provide type-specific operations for generating the expression 120 for a particular variable according to the variable's type. A particular plugin can generate the expression 120. The expression 120 can be sent to the device 130 for execution by the debugger 124 to generate the intermediate data 140. The intermediate data can be, for example, a byte array associated with an NSData object. The debugger 124 can send the intermediate data 140 from the device 130 to the host system 102. On the host system 102, the debugger can use the plugin associated with the variable's type to convert the intermediate data 140 to data that conforms to the host system variable type such as NSImage that is used to represent the variable in the integrated development environment 104.

The illustrated plugins 114 include a UIBezier to NSBezier plugin 176, which can convert UIBezier objects to NSBezier objects and display the NSBezier objects in the IDE 104, and a UIImage to NSImage plugin 178, which can convert UIImage objects to NSImage objects and display the NSImage objects in the IDE 104. The plugin to be used when the IDE 104 requests that a particular variable's value be displayed is selected based on the data type of the variable. For example, when a UIImage variable 138 is to be displayed, the UIImage to NSImage plugin 178 is selected from the plugins 114, and the operations provided by the plugin 178 are executed as described below. Note that although the processes described herein use plugins, the plugins are described merely as an example. Other arrangements that do not use plugins are possible, e.g., the instructions described herein as being associated with the plugins can be included directly in program code that implements the techniques described herein, or can be represented using other types of objects.

The serialization expression 120 can be executed in the application process 132 to create a data value in the application process 132's memory space that represents the value of the variable 138. The IDE process can then read the contents of the application process 132's memory space to retrieve the data. That is, the IDE process can cause the data to be converted to intermediate data 140 in a defined format and sent from the application process 132 to the IDE process via network communication. The IDE process then transforms the intermediate data 140 into an object on the host system. In the example of a variable that represents a graphical image, the image data is transformed to an object of a data type that is available in the IDE process. In this example, the NSImage data type is available on the host system 102, and an NSImage object is created and provided to a custom, e.g., NSImage-specific, user interface that displays the image, e.g., in a pop-over in the user interface of the IDE 104. The value of image variable 138 from the second device 130 is thus displayed in the user interface on the host system 102.

As another example, a variable stored in memory on the second device 130 can represent a Bezier path, i.e., a shape. The path or shape can be represented by a set of points, which, if represented as text, can be displayed as a set of (x, y) pairs. In accordance with one embodiment, the Bezier path can be displayed on the host system 102 by sending a request from the host system 102 to the second computing device for the points in the path represented by the variable. The second computing device 130 sends data representing the points back to the host system 102, which constructs a representation of the path based on the points, and renders the path in a custom user interface, e.g., in a popover or similar component in the IDE 104. Since the host system 102 and the second computing device 130 can have different types of hardware and operating systems, the variable can be represented by different data types on the two different machines, The data types on the two different machines can store data in different formats, so a Bezier path on the host system 102 can be represented as a sequence of bytes in one format, and a Bezier path that has the same points but is stored on the second computing device 130 can be represented by a different sequence of bytes in a different format. A conversion of the Bezier path between the two formats is therefore used when the Bezier path is moved between the machines. For example, a UIBezierPath on the second computing device 130 is mapped to an NSBezierPath on the host system 102. The host system 102 reads the information needed to reconstruct the representation of the path, which has the same appearance, i.e., displayed structure, as the representation of the path that exists on the second computing device 130, but is represented by a different sequence of bytes that is in the format used by the host system 102.

As introduced above, the representation of a data variable 138 displayed in the user interface of the IDE 104 can be specific to the type of the variable 138. Plugins 114 can be defined for each data type to be presented, and each of the plugins 114 can include specific instructions for generating, receiving, and displaying the value of variables of that type. For example, if a variable is of a type that represents a rectangle, the points of the rectangle are read from the application process 132, and a visual representation is generated on the host system 102. As another example, if a variable is of a type that represents a URL, the URL is mapped to a particular type of object with the assistance of operating system services (e.g., an application-specific object such as a slide presentation document, web page, and so on). A variable that represents a color can be presented on the host system 102 by requesting color information from the second computing device 130, such as a color space and attributes of the color. These values can be read back by the host 102, and a representation that shows the color can be generated and displayed in the user interface of the IDE 104. In one aspect, although values of particular data types have been described for illustrative purposes, any object having data that can be represented graphically and is not well suited to being shown textually can be shown using these techniques, e.g., by generating visual representations the objects.

In one or more embodiments, the remote variable 136 can represent a media object that includes graphical or audio content. The graphical content may include a still image or a video. The audio content may include audio data such as music, voice, or the like. Such media objects can be presented as displayed variables with Quick Look features such as the feature 118 displayed near the variable names. When a user selects the Quick Look feature for a media object, the media object's data is converted to a standard format by a serialization expression 144 executed by the debugger 124 on the device 130. The standard format may be, for example, an audio format such as MP3 or AAC (Advanced Audio Coding) for audio content, PNG (Portable Network Graphics) for image content, MP4 or QuickTime® for video content, and the like. The media object data can be represented as an object of a media-specific class, such as UIImage for images, or as an object of a generic data class, such as UIData. The media object data can then be deserialized on the host system 102 into a host variable 112 of a type that corresponds to the media object content, such as an NSData object or an NSImage object. The techniques described herein for processing images can thus be extended to process other media types, such as audio and video. Data transformations such as the UIImage to NSImage transformation described herein can be performed similarly for other types of media. Plugins that convert between specific media object types and generalized data types, such as the UIImage→NSImage plugin that converts from UIImage objects to NSImage objects, can be defined to convert from other types of media objects that can be stored on the device to corresponding types of media objects that can be stored on the host system.

Figure 1B:
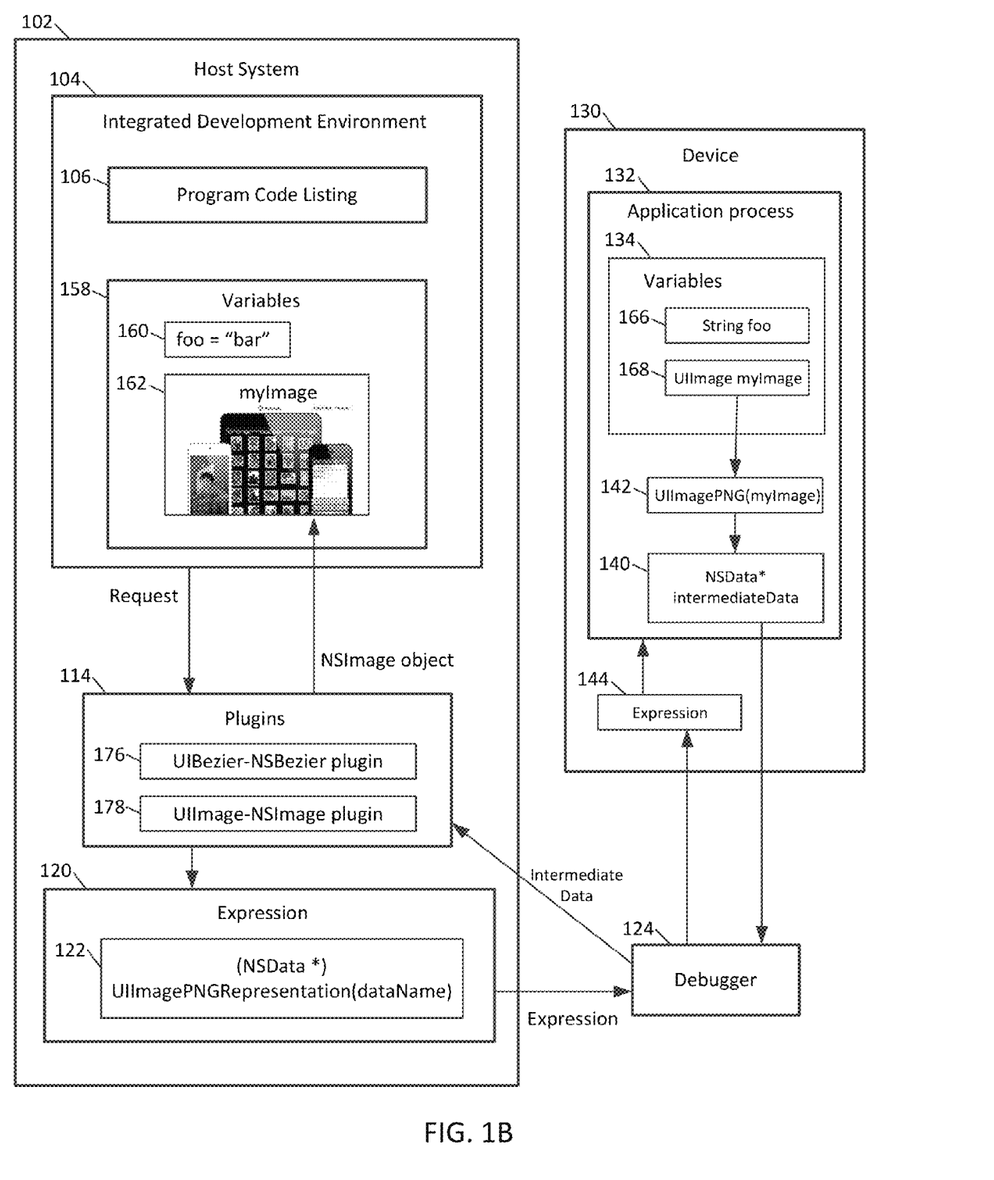

FIG. 1B is a diagram showing a multi-platform integrated development environment (IDE) 104 in accordance with one or more embodiments. The IDE 104 shown in FIG. 1B is similar to that FIG. 1A. FIG. 1B shows more specific details of the technique of transforming and displaying data. An IDE user interface 105 includes a program code listing view 106, which displays statements of the program executing on the device 130, and a variables view 158, which lists variables and their values in the current stack frame or other context. For example, a string variable 160 named "foo" that has a value "bar" would be displayed as "foo=bar". The value of the foo variable 160 is read from the device 130, which executes the application process 132 in which the variable foo 166, which has a data type string, is stored. The value of the foo variable displayed in the IDE 104 is based on the foo variable 166 executing in the process 132 on the device 130.

An image variable 162 named myImage that has a graphical image value is displayed as an actual image. An image variable can alternatively be displayed as "MyImage=[address]", where address is a numeric memory address. Displaying an image as a number provides little insight or meaning to the developer using the IDE.

In one or more embodiments, using the techniques described herein, the image itself can be displayed in the IDE user interface as the value of the variable 162. As a user steps through the program code listing 106 to execute and debug the program located in the application process 132 on the device 130, the data value of variables 134 in the memory of the application process 132 can be brought from the second computing device 130 to the host system 102 and, prior to or subsequent to being sent to the host 102, transformed to a format, such as an image, that represents the value in a meaningful way, e.g., by depicting structure of the data in the form of the image represented by the data, and can be displayed in the user interface of the IDE 104 on the host system 102. In this example, the actual image value of a variable named myImage 168 of type UIImage in the application process 132 executing on the second computing device 130 is sent to and rendered in the host system 102.

When a user issues a command to display a variable, debugger 124 issues commands to the application process 132. For example, the developer (i.e. user of the IDE) may request a UIImage variable 168 when the debugger hits a breakpoint in the program code listing 106. The application process 132 pauses, i.e., temporarily suspends execution, at the breakpoint. In one aspect, UIImage is a data type that is present in the application process 132, but not in the IDE process. Furthermore, the UIImage type need not be defined on the host system 102. A representation of the UIImage variable named myImage 168 in the application process 132 can be sent to the host system 102 and transformed to another data type, e.g., NSImage in the example of Mac OS X®, or other appropriate data type, for display in the variables view 158 as the value of the myImage variable 162.

In one or more embodiments, an expression 120 that can be run, e.g., evaluated, in the application process 132 is generated by a plugin 115 that corresponds to the data type of the variable being requested. Plugins 114 can be defined for each data type to be displayed on the IDE 104. The plugins 114 provide type-specific operations for generating an expression 120, retrieving results (i.e., data 142) of executing the expression 120 on the device 130, receiving the data 142 in an intermediate form (e.g., a byte array), and converting the intermediate form to an object that can be displayed in the IDE 104 (e.g., an NSImage object). The illustrated plugins 114 include a UIBezier to NSBezier plugin 176, which can convert UIBezier objects to NSBezier objects and display the NSBezier objects in the IDE 104, and a UIImage to NSImage plugin 178, which can convert UIImage objects to NSImage objects and display the NSImage objects in the IDE 104. The plugin to be used when the IDE 104 requests that a particular variable's value be displayed is selected based on the data type of the variable. For example, when a UIImage variable 168 is to be displayed, the UIImage to NSImage plugin 178 is selected from the plugins 114, and the operations provided by the plugin 178 are executed as described below. Note that although the processes described herein use plugins, the plugins are described merely as an example. Other arrangements that do not use plugins are possible, e.g., the instructions described herein as being associated with the plugins can be included directly in program code that implements the techniques described herein, or can be represented using other types of objects.

The expression 120 can be executed in the application process 132 to create a data 142 in the application process 132's memory space that represents the value of the myImage variable 168. The IDE process then reads the contents of the application process 132's memory space to retrieve the data 142, e.g., to cause the data 142 to be converted to intermediate data 140 in a defined format and sent from the application process 132 to the IDE process via network communication. The IDE process then transforms the intermediate data into an object on the host system. Thus, in the example of a variable that represents a graphical image, the image data is transformed to an object of a data type that is available in the IDE process. In this example, the NSImage data type is available on the host computing device 102, and an NSImage object is created and provided to a custom, e.g., NSImage-specific, user interface that displays the image, e.g., in a pop-over in the user interface of the IDE 104. The value of image variable 168 from the second device 130 is thus displayed in the user interface on the host device 102.

Figure 2:
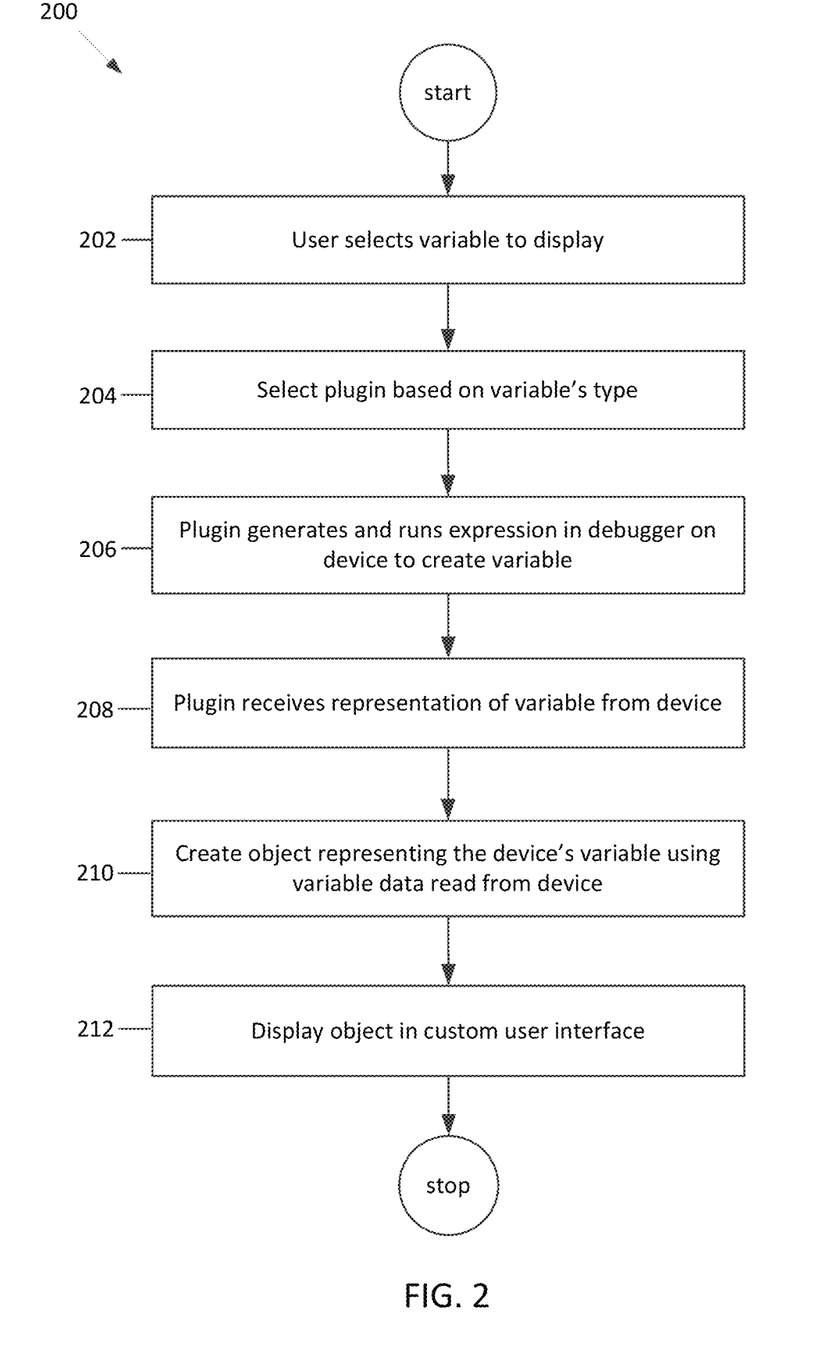
FIG. 2 illustrates a multi-platform data conversion and presentation processes in accordance with one or more embodiments.

FIG. 2 illustrates a multi-platform data conversion and presentation processes 200 in accordance with one or more embodiments. Process 200 can be implemented as, for example, computer program code encoded on a computer readable medium and executable by a processor of a computer system. The process begins at block 202 when a user initiates a command in a software development tool to display the value of a variable. The value of a variable is also referred to herein as a "data value." Each data value has a type, and is stored in memory in a particular format. As an example, process 200 can begin at block 202 when the user of the IDE 104 selects the Quick Look feature 118 located next to the image variable.

The formats in which the variable data is stored on the host system 102 can be different from the format in which data is stored on the device 130. The difference in formats can occur, for example, if the two systems use different byte ordering (little endian vs. big endian), different sizes for data types such as numbers, different operating systems, and so on. The formats in which the device can store data can be different for other reasons, e.g., because a particular data type does not exist on the host system.

Type-specific instructions, referred to herein as plugins, are used to translate data between the formats of the two systems. Block 204 looks up the plugin to use based on the type of the variable that is to be displayed. For example, block 204 can look up the plugin in a table that maps data types to plugins, such as the plugins table 123. The look up of the plugin can be performed using the host type or the device type as a search key. For example, when the image variable shown in FIG. 1A is selected, block 204 searches the variables table 113 for an entry having the same name as the variable that is to be displayed. Since the variable name is "image," the second row of the variables table 108 matches the search, and the host type and device type are NSImage and UIImage, respectively, according to the matching entry in the variables table 108. Further, there is a value column in the variables table, but the value of the image variable is not yet known, so the value is null, empty, or undefined at block 204.

Once the host type has been determined, the plugins table 123 is searched for an entry that has matching a host type (NSImage). Alternatively, the table 123 can be searched for an entry that has a device type matching UIImage, or both the host and device types can be used as the search criteria. The plugin 115 has or can access type-specific instructions for the UIImage type. More specifically, the plugin has instructions that can create an expression to be used in the application process 132 to generate a representation of a data value of a particular type in a defined format. The representation of the data value is shown as intermediate data 140. The values of variables 134 on the device 130 are stored in the device's memory using a representation (i.e., format) that is compatible with the device 130.

At block 206, the plugin generates and executes one or more serialization expressions 120. Each serialization expression 120 can be generated by the expression generator 116 of FIG. 1A and executed in the application process 132 on the second computing device by supplying the expressions 120 to the debugger 124 for evaluation. In one or more embodiments, the debugger 124 can be located on a different system, e.g., on the device 130 or on a third device, and the IDE 104 sends the expression 120 via a communication network. The debugger 124 executes the expression in or in cooperation with the application process 132. Each expression 120 can be executed by sending the expression to the debugger 124, which receives the expression and creates a local copy or reference of the expression 144. Execution of the expression creates intermediate data 140 that represents the one or more variables 134 in a defined format (e.g. PNG image data, a list of coordinates arranged in a defined memory layout, and so on). The intermediate data 140 provides a pointer or reference of a universal data type that refers to the variables 134 in the defined format. When an expression 120 is executed, the debugger generates, e.g., outputs, the intermediate representation of the corresponding variable 136. The intermediate data 140 can be sent from the application process 132 to the development tool 104 via a communication network. For example, the expression 120 used for the image variable can be (NSData*) UIImagePNGRepresentation ("image"). The intermediate data 140 generated by the expression 120 for the "image" variable can be a sequence of bytes in the PNG image data format. The debugger 124 on the second computing device 130 sends this sequence of bytes back to the IDE 104.

More specifically, the expression used for a variable of type UIImage can be, for example, (NSData*) UIImagePNGRepresentation(dataValueName), where dataValueName is the name of the variable whose value is to be read. The UIImagePNGRepresentation function converts the UIImage referred to by dataValueName to an object in the PNG image format, which is a defined format that can be decoded by the host system. The initial portion of the expression, (NSData*), converts the PNG object to the generic data type that has a widely-recognized format (an array of bytes) that can refer to any type of data, so that the data can be marshaled by generic data serialization code into intermediate data 140 to be sent to the host system. At block 208, the IDE 104 reads and interprets the data received from the second computing device 130. The IDE 104 can, for example, receive the data from the debugger 124 via a communication network. As described above, the execution of the expressions 120 via the debugger 124 on the second computing device 130 causes one or more intermediate values 140 to be generated in the memory of the second device in a defined data format, such as a list of points, a bitmap in specific format, or the like. The defined data format is determined by the expression, which is in turn selected or generated on the host system as described above. For example, the intermediate data 143 generated by the expression 144 includes a sequence of bytes in the PNG format. Block 208 receives the sequence of bytes from the device 130 using, for example, network communication to read the bytes onto the host system 102 via a communication network.

The plugin 114 executing on the host system 102 can then request the values in the defined format (if not previously requested) and read the intermediate data 140 from the second computing device in the defined format. Upon receiving the intermediate data 140, the plugin 115 creates or references a local copy of the intermediate data 140. This copy is shown as intermediate data 143.

At block 210, an object is created on the host 102 representing the device's variable 134 using the intermediate data 143 read from the device. Block 210 can be performed by, for example, the data de-serializer of FIG. 1A. The values in the intermediate data 143 can be understood as raw data, which is used by the type-specific plugin 115 on the host system 102 to construct an object that is a value of the corresponding data type, e.g., an image, path, or the like. The object is stored in the host variables table 113 as a value in a row that corresponds to the variable 134. The IDE 104 can use the plugin 115 associated with the type of the remote variable 136 to translate the received intermediate data 143 to a format that is compatible with the host system 102, and store the translated intermediate data in the host variables table 113 as the value of the corresponding remote variable 136.

For example, the plugin can create an NSImage object, which looks like the UIImage that exists on the second computing device 130, based on the data generated on the second computing device and received on the host system. The data deserializer 117 converts the intermediate data 143 from the PNG format to an NSImage object. For example, if the NSImage class provides a method that initializes an NSImage object from a sequence of bytes in the PNG format, then the data deserializer 117 can invoke that method to perform the conversion. The result of the conversion is an NSImage object stored in memory at address 0x024115123. The deserializer 117 stores the address of this NSImage object in the value column of the host table in the row that includes the "image" variable. The IDE user interface 105 can subsequently retrieve the address of the NSImage object from the variables table 113 and use an appropriate display component to present the NSImage to a user.

In the case of a variable that represents a path or curve, the conversion from the device's type (e.g., UIBezier) to the host's type (e.g., NSBezier) can involve intermediate data 140 that is a set of points in a defined data format, such as a list of integer (x,y) pairs. In one embodiment, there is no existing data type on the host system 102 corresponding to the data type on the device 130, in which case an appropriate data type can be selected by the plugin on the host system 102 to represent the object for the purposes of displaying the object in the user interface. At block 212, the plugin uses a custom (type-specific) user interface to display a graphical representation 112 of the object in the IDE user interface 104. The IDE 104 can then generate a representation of the value using a user interface component that is associated with the type of the remote variable 136. The IDE user interface 105 can retrieve the address of the NSImage object, 0x024115123, from the variables table 113. For example, the image variable's value of 0x024115123 can be displayed in an image display component, such as the popover window 302 labeled nsImage shown in FIG. 3. The image display component performs the task of retrieving the image data from the address 0x024115123 and rendering the image data on the display of the host system 102. The rendered image data is a human-readable representation of the remote variable 136.

FIG. 3 illustrates graphical representations of the structure of data in accordance with one or more embodiments. The graphical representations shown in FIG. 3 include an image representation 302, an attributed string representation 304, a word processor document representation 306, and a color representation 308. Note that the representations include a button that a user can select to cause the data object to be opened in an associated application. For example, the image representation 302 includes an "Open With Preview" button that, when selected, opens an image preview application to display the image representation 302.

FIG. 3 shows a popover window that displays an image representing the value of a variable named nsImage. The variable's type is pointer to the NSImage type. The variable's value is interpreted as an image, and the image is presented in the popover window in the user interface 302. The popover includes a button labeled "Open With Preview" that can be used to load the image into an application that displays images. In FIG. 3, an image is displayed in an image popover 302, a string is displayed in a text popover 304, a document is displayed in a document popover 306, and a color is displayed in a color popover 308. Colors can be displayed using numeric values to indicate the exact color, as shown in FIG. 3. The color is displayed in a color popover 308 as square shaded with the color and the red, green, blue, and alpha components of the color. FIG. 4 illustrates additional graphical representations of the structure of data in accordance with one or more embodiments. The graphical representations shown in FIG. 4 include a URL, i.e., web page, representation 402, a Bezier path representation 404, point, line, and rectangle representations 406, and a memory page representation 408.

FIG. 4 shows representations of additional different types of data presented in meaningful formats. Geometric objects 406 include a point, dimension measurements, and a rectangle. The geometric objects are displayed as graphical objects annotated with specific values of the objects. The point variable named "point2" is annotated with the values of the x and y coordinates. The size variable named "size2" is annotated with the height and width of the dimension. The rectangle per variable named "rect1" is annotated with the width and height of the rectangle. A sequence of bytes that represents text data is displayed as a memory dump 408 that shows a portion of the bytes (e.g., 512 bytes) and allows a user to scroll through the complete range of bytes.

Figure 5:
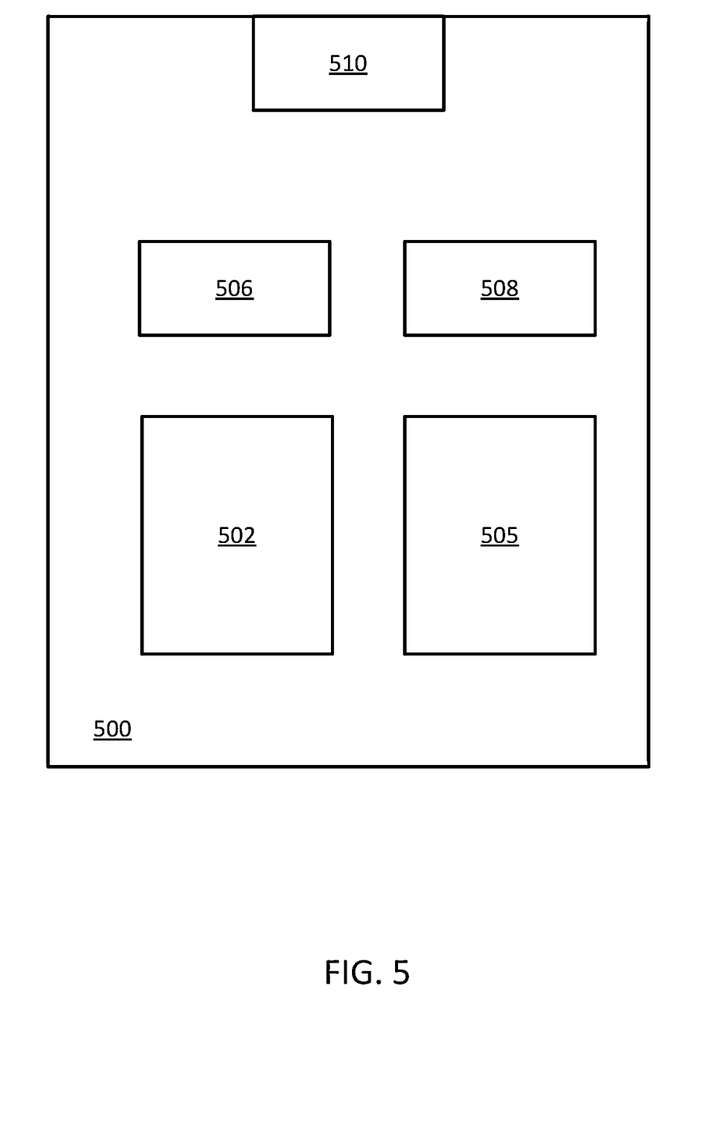
FIG. 5 shows a system block diagram of computer system used to execute the software of an embodiment.

FIG. 5 shows a system block diagram of computer system 500 used to execute the software of an embodiment. Computer system 500 includes subsystems such as a central processor 502, system memory 505, fixed storage 506 (e.g., hard drive), removable storage 508 (e.g., FLASH), and network interface 510. The central processor 502, for example, can execute computer program code (e.g., an operating system) to implement the invention. An operating system is normally, but necessarily) resident in the system memory 505 during its execution. Other computer systems suitable for use with the invention may include additional or fewer subsystems. For example, another computer system could include more than one processor 502 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method for presenting data in a development environment on a first computer system, the method comprising:
    at the first computer system:
        receiving a request to display a value of a variable stored in a memory of a second computer system, the variable having a variable name;
        searching a variable lookup table for an entry associated with the variable name;
        determining a variable type based on the entry associated with the variable name;
        searching an instruction lookup table for an entry associated with the variable type;
        determining one or more type translation instructions based on the entry associated with the variable type, wherein the one or more type translation instructions translate data from a first format to a second format;
        sending the one or more type translation instructions to the second computer system to generate a first representation of the variable in the first format;
        receiving the first representation of the variable in the first format;
        translating the first representation of the variable in the first format to a second representation of the variable in the second format in accordance with the one or more type translation instructions; and
        displaying a human-readable representation of the variable based upon the second representation of the variable.

2. The method of claim 1, wherein the variable lookup table defines an association between the variable type and the variable name, and the instruction lookup table defines an association between the variable type and the one or more type translation instructions.

3. The method of claim 1, wherein the one or more type translation instructions include one or more debugger commands configured to cause a debugger to generate a platform-independent representation of the data.

4. The method of claim 3, wherein the one or more debugger commands comprise one or more expressions that, when evaluated, cause an application process executing on the second computer system to generate the first representation of the variable in the first format.

5. The method of claim 3, wherein sending the one or more type translation instructions to the second computer system comprises:
    sending, via a network, the one or more debugger commands to the debugger located on the second computer system, wherein the debugger is configured to access an application process located on the second computer system.

6. The method of claim 3, wherein receiving the first representation of the variable in the first format comprises:
    receiving the platform-independent representation of the data from the debugger.

7. The method of claim 6, wherein translating the first representation of the variable comprises:
    creating an object on the first computer system; and
    setting content of the object based on the platform-independent representation of the data, wherein the object represents the second representation of the variable.

8. The method of claim 7, wherein displaying the human-readable representation of the variable comprises displaying a user interface component configured to display the object of a type associated with the second representation of the variable.

9. The method of claim 1, wherein the variable represents a media object, and displaying the human-readable representation includes presenting a representation of the media object.

10. The method of claim 1, wherein the variable represents a graphical object, and displaying the human-readable representation includes displaying a graphical image of the graphical object.

11. The method of claim 1, wherein the first format is a memory representation of a first data type on the second computer system, and the second format is a memory representation of a second data type on the first computer system.

12. The method of claim 1, wherein a debugger located on the second computer system generates the first representation of the variable in the first format, and sends the first representation of the variable in the first format to the first computer system.

13. A system, comprising:
a first computing device and a second computing device, wherein the first computing device includes a processor that is configured to cause the first computing device to:
receive a request to display a first data object stored in a memory of the second computing device, wherein the first data object is of a first data type in a process configured to execute on the second computing device;
search an instruction lookup table for an entry associated with the first data type;
determine one or more type translation instructions based on the entry associated with the first data type;
generate, using the one or more type translation instructions, an expression configured to convert the first data object to a defined data format;
send the expression to the process on the second computing device, wherein the second computing device receives and executes the expression in the process to produce intermediate data that represents the first data object in the defined data format;
receive the intermediate data;
create, using the one or more type translation instructions, a second data object of a second data type, wherein the second data object is based upon the intermediate data, and the second data object is a representation of the first data object; and
present the second data object on the first computing device.

14. The system of claim 13, wherein the processor is further configured to cause the first computing device to display a graphical representation of the second data object in a user interface.

15. The system of claim 13, wherein the processor is further configured to cause the first computing device to send the expression to a debugger, and the debugger sends the expression to the process on the second computing device.

16. The system of claim 13, wherein the first data object has one or more attributes, and the one or more type translation instructions set one or more attributes of the second data object based upon the intermediate data, resulting in the second data object having the same attributes as the first data object.

17. The system of claim 16, wherein the one or more attributes comprise one or more values that represent one or more points in a line, polygon, or Bezier curve.

18. A non-transitory machine-readable medium configured to store instructions that, when executed by a processor of a first computer system, cause the first computer system to carry out steps that include:
receiving a request to display a value of a variable stored in a memory of a second computer system, the variable having a variable name;
searching a variable lookup table for an entry associated with the variable name;
determining a variable type based on the entry associated with the variable name;
searching an instruction lookup table for an entry associated with the variable type;
determining one or more type translation instructions based on the entry associated with the variable type, wherein the one or more type translation instructions translate data from a first format to a second format;
sending the one or more instructions to the second computer system to generate a first representation of the variable in the first format;
receiving the first representation of the variable in the first format;
translating the first representation of the variable in the first format to a second representation of the variable in the second format in accordance with the one or more type translation instructions; and
displaying a human-readable representation of the variable based upon the second representation of the variable.

19. The non-transitory machine-readable medium of claim 18, wherein the variable lookup table defines an association between the variable type and the variable name, and the instruction lookup table defines an association between the variable type and the one or more type translation instructions.

20. The non-transitory machine-readable medium of claim 18, wherein the one or more type translation instructions include one or more debugger commands configured to cause a debugger to generate a platform-independent representation of the data.

21. The non-transitory machine-readable medium of claim 20, wherein the one or more debugger commands comprise one or more expressions that, when evaluated, cause an application process executing on the second computer system to generate the first representation of the variable in the first format.

22. The non-transitory machine-readable medium of claim 20, wherein sending the one or more type translation instructions to the second computer system comprises:
sending, via a network, the one or more debugger commands to the debugger located on the second computer system, wherein the debugger is configured to access an application process located on the second computer system.

23. The non-transitory machine-readable medium of claim 20, wherein translating the first representation of the variable comprises:
creating an object on the first computer system; and
setting content of the object based on the platform-independent representation of the data, wherein the object represents the second representation of the variable.

24. The non-transitory machine-readable medium of claim 18, wherein the first format is a memory representation of a first data type on the second computer system, and the second format is a memory representation of a second data type on the first computer system.

* * * * *